UNITED STATES PATENT OFFICE.

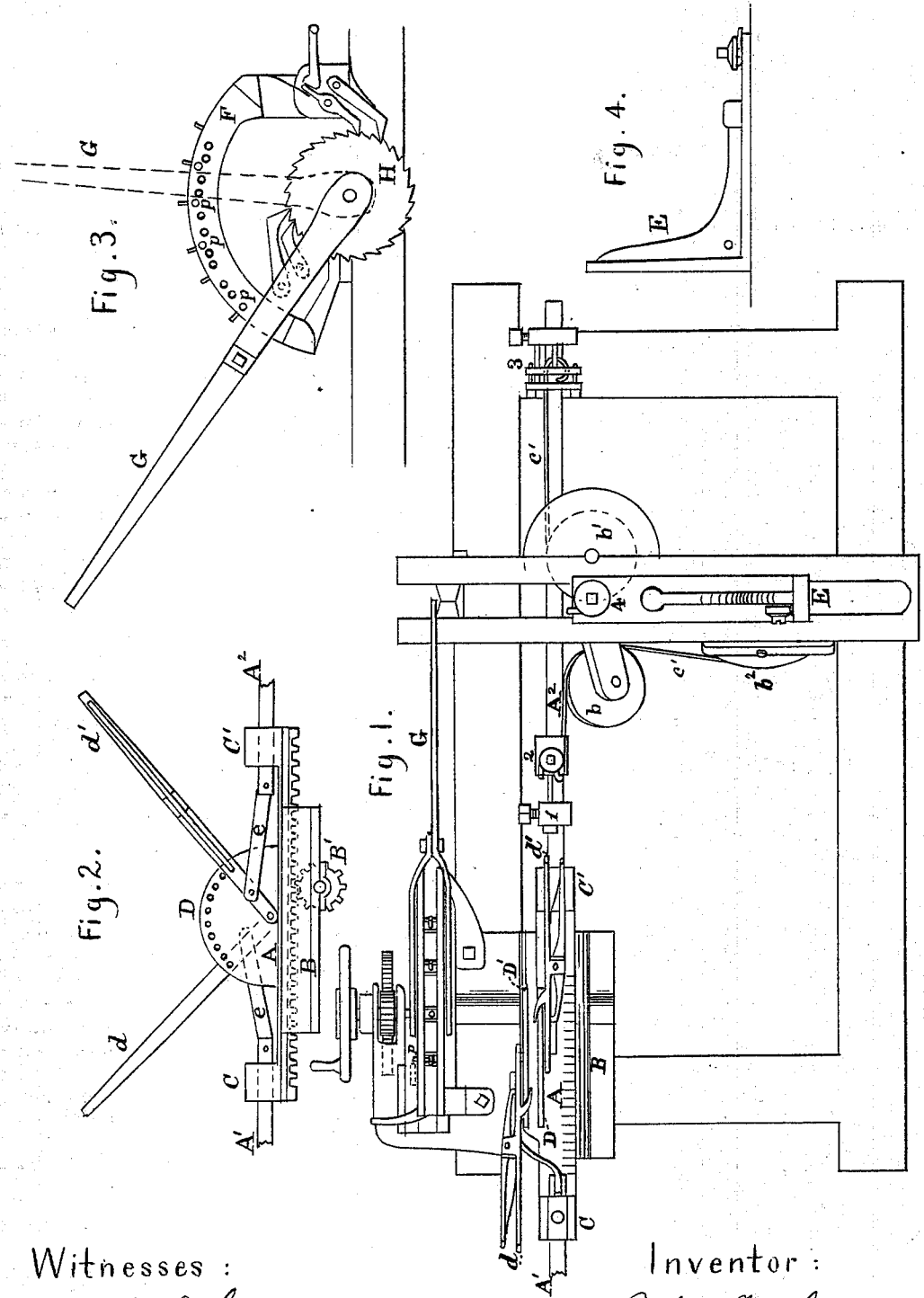

PERLEY M. CUMMINGS, OF LYONS, IOWA.

IMPROVEMENT IN HEAD-BLOCKS.

Specification forming part of Letters Patent No. 144,388, dated November 11, 1873; application filed September 12, 1873.

*To all whom it may concern:*

Be it known that I, PERLEY M. CUMMINGS, of Lyons, in the county of Clinton and State of Iowa, have invented certain new and useful Improvements in Head-Blocks; and I do hereby declare the following to be a full, clear, and exact description of the invention, such as will enable others skilled in the art to which it pertains to make and use it, reference being had to the accompanying drawings, which form part of this specification, in which drawings—

Figure 1 is a plan view. Fig. 2 is an inside view of index-plates and levers for adjusting each head-block separately. Fig. 3 is an outside view of index-plate with adjustable pins, and lever for operating and adjusting both head-blocks at once. Fig. 4 is a side view of the head-block with cable-clamp attached.

My invention consists of the arrangement and combinations of devices for readily adjusting both head-blocks together, or each one separately, so as to saw the lumber of the same thickness at both ends or in a wedge shape, as hereinafter set forth.

The adjusting-bar is made in three parts, A, $A^1$, and $A^2$, all connected by guides on the ends of the part represented by A, which slides in guides B, and is operated by a pinion, B', working in the notches on the under side of the bar, as shown in Fig. 2. Bars $A^1$ and $A^2$ slide in the guides C C' on the ends of bar A, and are operated by levers $d$ $d'$ attached to index-plates D D' and connecting-bars $e$ $e$, as shown in Figs. 1 and 3. The head-blocks E are operated by means of cable-wires $c'$, which are held by the clamps 1, 2, 3, and 4 on the bars and head-blocks, and pass around and work in the pulleys $b$ $b^1$ $b^2$, as shown in Fig. 1. F represents an index-plate provided with adjustable pins $p$ for holding in position lever G, which is attached to the shaft of rack-wheel H, and of pinion B', by which bar A is operated. The pins are arranged so as to slide through the side of the plate to hold the lever in any required position, as is shown, for example, by the position of the lever represented by dotted lines in Figs. 1 and 3.

When the log is to be sawed into lumber of a uniform thickness, the head-blocks are properly adjusted for that purpose, and held in place by the levers and their spring-catches $d$ $d'$ on the index-plates D D', which plates are attached to and move with bar A, and both blocks are moved at the same time and an equal space by the movements of the bar A. The thickness of the lumber is regulated by the proper adjustment of the lever G. When one end of the log is hollow, and that or any other defect is to be cut out at either end, or the lumber is to be thicker at one end than the other, each block is separately adjusted, as required for that purpose by means of the levers $d$ $d'$ on plates D D'.

I claim—

1. In saw-mill head-blocks, the feed-bar, composed of the parts A, $A^1$, and $A^2$, in combination with head-blocks E, all constructed, arranged, and operating in the manner described.

2. The arrangement and combination of the quadrant-plates D D, feed-bar in parts A $A^1$ $A^2$, guides C C', levers $d$ $d'$, and connecting-bars $e$ $e$, substantially as and for the purpose specified and described.

In testimony that I claim the foregoing I have hereunto set my hand this 9th day of August, 1873.

PERLEY M. CUMMINGS.

Witnesses:
WM. W. SANBORN,
J. S. DARLING.